Patented Nov. 28, 1944

2,363,852

UNITED STATES PATENT OFFICE 2,363,852

WEATHERPROOF SNAIL BAIT

John G. Beekler, Santa Monica, Calif.

No Drawing. Application July 12, 1941,
Serial No. 402,243

6 Claims. (Cl. 167—48)

This invention relates to a weatherproof snail bait useful in the extermination of snails, slugs, wire worms, and the like.

An object of the invention is to provide a snail bait that is weather-resistant, particularly resistant to water that may be applied thereto such as by sprinkling or by rain.

The ability of metaldehyde to exterminate snails, slugs, wire worms, and the like has been recognized. Metaldehyde is polymerized acetaldehyde. Acetaldehyde, $CH_3.CHO$, or $C_2H_4O$, is formed by the controlled oxidation of ethyl alcohol. If a trace of sulphuric acid is added to anhydrous acetaldehyde and the mixture is kept at a low temperature, about the freezing point of water, the acetaldehyde "polymerizes." That is, four molecules combine into one, which is metaldehyde, $(C_2H_4O)_4$. This is a crystalline substance which, when heated to about 150° C. (302° F.) sublimes without melting, and at the same time is partly decomposed into acetaldehyde. If heated in a sealed tube, that is, under pressure, it decomposes completely into acetaldehyde. If heated for several days at 60° to 65° C. (140° to 149° F.), it forms a mixture of acetaldehyde and paraldehyde. The latter is a liquid polymer which has the formula $(C_2H_4O)_3$.

Heretofore, it has been customary to prepare metaldehyde snail baits by mixing finely divided metaldehyde with some organic material such as bran, causing the metaldehyde particles to adhere to the bran. The resulting mixture has been sprinkled or spread around flower beds or other vegetation subject to snail attack as a means of protecting the vegetation from the snails and slugs which are not only attracted by the metaldehyde but are poisoned thereby.

An objection to the above-described form of snail bait is that it is not weather-resistant or resistant to moisture which may be applied by sprinkling or by rain. The bran quickly molds and disintegrates and the metaldehyde particles become detached therefrom and are washed into the soil, thus losing their effectiveness against snails and slugs although they may still be effective in the soil against wire worms. Consequently, because of this objection whenever flower beds that are protected by the bran mixture bait are sprinkled a new application of the bait is necessary following the sprinkling in order to maintain protection. By means of the snail bait embodying the present invention it is possible to indefinitely protect vegetation around which the bait is applied because of the fact that the present snail bait is weatherproof or weather-resistant.

Specifically, the present snail bait comprises a weatherproof or weather-resistant body preferably rendered somewhat porous having distributed therethrough finely divided metaldehyde.

In its preferred form I manufacture the improved snail bait as follows: I reduce metaldehyde to a finely divided condition and mix equal weights of finely divided metaldehyde and paraffin oil. These are stirred together to make a paste. Metaldehyde is insoluble in most instances being only slightly soluble in benzoil, ether, and chloroform. The metaldehyde and paraffin oil are stirred together to make a paste. Paraffin wax is then melted and there is mixed therein powdered sugar and a cereal flour, the proportions being in the preferred form three ounces of sugar and six ounces of cereal flour to six ounces of paraffin wax. At the same time there is introduced some of the paste prepared from the mixture of metaldehyde and paraffin oil, the admixture of the paste being such as to incorporate sufficient of the paste so that in the resulting composition there will be present approximately 2% metaldehyde by weight. The resulting mixture is then poured into molds and allowed to cool and constitutes the finished weatherproof snail bait.

The metaldehyde present is evenly distributed throughout the paraffin wax and is held therein by the paraffin wax which serves as a weatherproof or weather-resistant holder for the metaldehyde. The sugar and cereal present serve somewhat as a food attracter for snails, slugs, and wire worms, but an important function assumed by these ingredients is to render the paraffin somewhat porous so that the metaldehyde particles distributed throughout the paraffin will be exposed in the pores. For the cereal flour used, I prefer to use equal proportions of wheat, barley, oat, and rice flour. It will be understood, however, that any of these ingredients are somewhat optional and that the cereal, flour, and the sugar may be dispensed with entirely and porosity of the paraffin secured in other manners. They are preferred primarily for the reason that they not only render the paraffin porous but also act somewhat as a food attracter. It is not necessary in all instances to mix the finely divided metaldehyde with paraffin oil. The finely divided metaldehyde may be introduced into the molten paraffin wax directly and distributed throughout the molten wax by vigorous stirring.

The mixture may be molded into various shapes, such as bars, rings, or segments of rings also placed in containers of shape of design, such as tin lids, bars, etc., as well as coatings over dummies or forms of wood. When made in ring form the ring is merely positioned over the bush or plant that it is desired to protect. When made in segment form, segments may be positioned around the base of the plant or bush that is to be protected. Bars may be positioned at intervals around the edges of flower beds that are to be protected. I also find it advantageous to mold the mixture into the form of small balls or pellets that can be positioned around the base or in the neighborhood of vegetation that is to be protected.

The improved snail bait is highly resistant to water and weather. I find that regardless of repeated applications of water, such as by rains or by sprinkling that the snail bait embodying the present invention still retains its effectiveness as a snail exterminator with no noticeable decrease in its ability to exterminate slugs and snails despite long weathering conditions.

Paraffin wax is preferably employed for the body of the snail bait because of its cheapness and its ability to resist weathering conditions. However, any other weather-resistant material that will not chemically react with the metaldehyde may be substituted therefor such as resins, both natural and synthetic, tallow or candle stock, gums, plastics, and other waxes. Whatever is used for the body should be weather-resistant, capable of being melted at a relatively low temperature commensurate with that of paraffin wax or should be soluble in a volatile solvent so that it can be molded to the desired shape. In the preferred form whatever is used for the body should preferably, but not necessarily, be rendered porous and have the metaldehyde evenly distributed throughout without causing the metaldehyde to undergo any chemical change.

Metaldehyde fades or is exhausted in power when exposed to air and sun due to volatilization. It is this volatility of metaldehyde that enables the night crawler to locate it. When deposited upon bran or other similar carriers for distribution it becomes exposed to excessive and exhaustive volatilization and even though not moistened by water, such method exhausts and reduces its value. When contained in plastic mass of my formula only a very minimum of said mass is exposed to the exhausting and destructive elements. The bulk of the metaldehyde is sealed in the mass, is in no position to volatilize, is confined almost hermetically sealed and stored in the mass, is only exposed when contacted from the outer surface as it may be devoured by the enemy.

It is so reservoired for long periods of time with practically no exposure or deterioration and so retains its virtue, power, and active destructive function.

Various changes may be made in the details of construction without departing from the spirit or scope of the invention as defined by the appended claims.

I claim:

1. A weatherproof snail bait comprising finely divided metaldehyde distributed in paraffin wax.

2. A weatherproof snail bait comprising finely divided metaldehyde distributed in paraffin wax rendered porous by the admixture of a cereal flour.

3. A weatherproof snail bait comprising finely divided metaldehyde distributed in paraffin wax rendered porous by the admixture of a cereal flour and sugar.

4. A weatherproof snail bait comprising a body of paraffin wax having incorporated therein approximately 60% by weight of sugar and cereal flour and approximately 2% by weight of finely divided metaldehyde.

5. A weatherproof snail bait comprising a body containing a substantial proportion of wax and having distributed therein finely divided metaldehyde.

6. A weatherproof snail bait comprising a body composed of a substantial portion of wax having distributed therein approximately 2% by weight of finely divided metaldehyde.

JOHN G. BEEKLER.